May 4, 1965  J. J. SABATINI  3,181,374
ENGINE STARTER DRIVE
Filed April 1, 1963
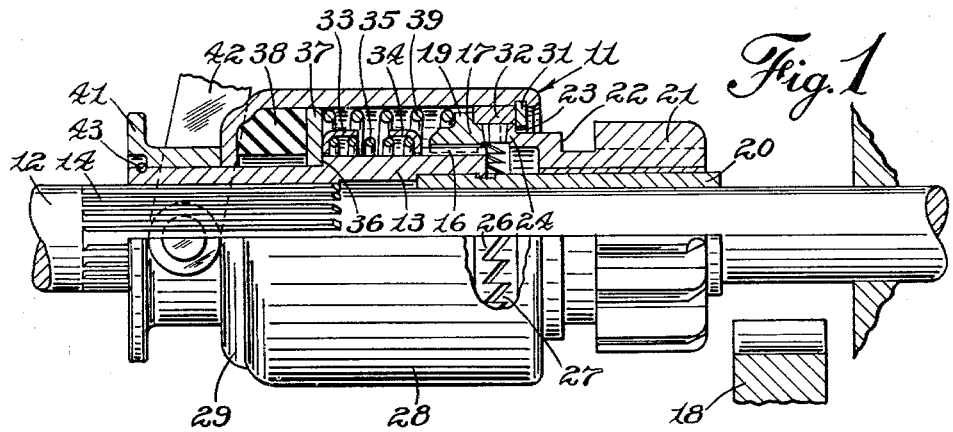
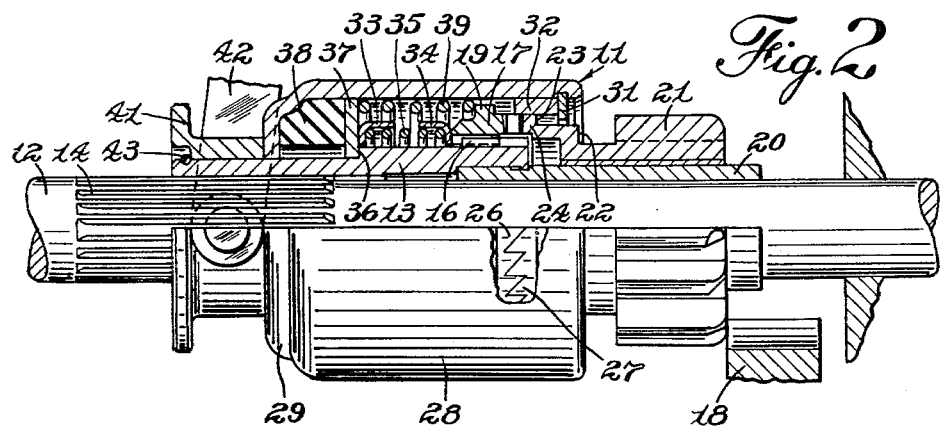
WITNESS:
Esther M. Stockton
INVENTOR.
John J. Sabatini
BY
John Philip Ryan
ATTORNEY

United States Patent Office 3,181,374
Patented May 4, 1965

3,181,374
ENGINE STARTER DRIVE
John J. Sabatini, Horseheads, N.Y., assignor to The Bendix Corporation, Elmira Heights, N.Y., a corporation of Delaware
Filed Apr. 1, 1963, Ser. No. 269,433
5 Claims. (Cl. 74—6)

The present invention relates to an engine starter drive for an internal combustion engine and more particularly to a starter drive of the positive shift type including therein a dentil clutch adapted to provide power transmission, overrunning and indexing functions.

In prior art developments various drive configurations have been tried in an effort to provide heavy duty starter gearing including clutch means providing in combination positive power transmission, reliable overrun characteristics and an indexing function. These developments have not been successful for several basic reasons. The clutches have failed because of poor dentil life. Dentil mesh is extremely important. Shallow dentil mesh has resulted in premature dentil wear. Deep dentil mesh has failed to provide the lost motion necessary to accommodate proper indexing functions. Deep dentil mesh also results in drive failures attributable solely to poor clutch spring life. The ideal drive should therefore combine the features of a proper degree of dentil mesh to provide long dentil life, means to provide adequate lost motion for indexing functions and proper biasing spring structures to provide a drive not susceptible to failures because of poor spring life. It is also desirable that the ideal drive have a clutch overrunning torque value that never exceeds its break-away torque value so that during extremely high speed overruns the clutch will not have attendency to pick up or frictionally drive the starter motor armature shaft.

In other prior art developments of drives of this character various dentil clutch configurations using deep or shallow dentils have been utilized to overcome poor dentil life or poor clutch spring life. Those embodiments utilizing dentil clutches having deep dentil engagement for both the indexing function and the cranking or power transmission function were noted for having poor clutch spring life. Poor spring life has been determined to be directly attributable to the fact that the clutch utilizes deep seating dentils. There is no lost motion between the driving and indexing functions present in a clutch utilizing deep dentil engagement. Consequently, unless the pinion and engine ring gear teeth are in perfect alignment at the time of engagement, there will be varying degrees of geared tooth abutment and this opposition to pinion axial movement will be immediately transferred from the driven clutch member to the driving clutch member and thence directly to the clutch spring. Because there is no slack or lost motion the driving clutch biasing spring will be subjected to a violent and sudden indexing action which results in poor spring life.

Drives have been tried using dentil clutches having shallow dentil engagement for both indexing and cranking functions. These drives have not proved too successful either. Poor dentil life has been determined to be directly attributable to the fact that the clutch utilizes shallow seating dentils. Upon return from the indexing operation the dentils tend to separate by reason of the camming action of the dentils and it has been found in many instances the dentils assume a substantially peak-to-peak engagement. When the cranking or starting load of the engine is subsequently picked up by the clutch, there is insufficient tooth engagement to carry the load, and consequently, the dentil teeth shear off.

The use of a dentil clutch connection adapted to combine controllable shallow dentil engagement for the power transmission operations and deep dentil engagement for the indexing operations provide beneficial improvements. It is, of course, understood the deep dentil engagement is desirable for indexing functions and is obtained only after the lost motion provided by the controlled normal shallow dentil engagement is dissipated. A dentil clutch having these composite features will result in a starter drive having better and longer clutch spring life and improved dentil life. These desirable ends are attained by positioning an annular spacer element within the starter drive housing adapted to engage a driving clutch during the power transmission operations to thereby limit the degree of clutch dentil mesh. These spacer means are ineffective during retrograde movements of the pinion and the driven clutch relative to the housing thereby allowing the clutch elements to take up the slack or lost motion provided by shallow seated dentils thereby providing a deep seated dentil connection. It is, therefore, the object of the present invention to provide an engine starter drive including a dentil clutch element adapted for deep dentil engagement during indexing operations and adapted for shallow dentil engagement during driving operations.

It is another object of the present invention to provide starter gearing for internal combustion engines which is simple, efficient, reliable and economical to manufacture and fabricate.

It is another object of the present invention to provide a device incorporating resiliently yieldable means for effectively utilizing the deceleration torque of the starting motor at the initiation of the cranking or driving operation.

It is still another object of the present invention to provide a starter drive having a dentil clutch wherein a proper degree of dentil mesh combined with a proper biasing spring structure provides a drive not susceptible to premature spring and dentil failures.

It is a further object of the present invention to provide a starter drive including a dentil overrunning clutch having an overrunning torque value that never exceeds the clutch break-away torque.

With the above and other objects in view which will appear as the description proceeds, this invention resides in the novel construction, combination and arrangement of parts substantially as hereinafter described and more particularly defined in the appended claims, it being understood that such changes in the precise embodiment of the hereindisclosed invention may be made as come within the scope of the claims.

The accompanying drawing illustrates a single example of a physical embodiment of the invention constructed according to the best mode so far devised for the practical application of the principles thereof, and in which:

FIGURE 1 is a side elevational view, partly in section and broken away, of a preferred embodiment of the invention showing the drive in an idle position and the spacer means operative to limit the degree of clutch dentil engagement; and, FIGURE 2 is a view similar to FIGURE 1 showing the drive when the pinion and engine gear teeth abut and the clutch dentil teeth are permitted to deeply mesh independent of the spacer element as during the clutch indexing operation.

Referring now to the drawing wherein like reference characters represent like parts in the two views, in FIGURE 1 there is illustrated a starter drive for an internal combustion engine generally designated 11 mounted on a power shaft 12 of a starting motor (not shown). The drive includes a sleeve 13 slidably but non-rotatably secured to the power shaft by means of straight splines 14. The external surface of the forward or right-hand extremity of the sleeve has helical splines 16 formed thereon and a driving clutch member 17 is threaded thereon for movements in directions toward and away from a gear 18 of the engine to be started. The driving clutch member is provided with a radially outwardly extending flange 19 for a purpose to be hereinafter described.

A pinion 21 is slidably journalled on a sleeve bearing 20 secured to the sleeve and supported on the reduced diameter extremity of the power shaft. The pinion is adapted for movements into and out of engagement with the gear 18. The sleeve bearing under the pinion permits the pinion to be moved toward the engine gear regardless of contamination on the power or armature shaft 12. The inner or left-hand extremity of the pinion is radially offset as at 22 and 23 to provide a driven clutch member 24. The opposing or adjacent faces of the clutch members 17 and 24 are provided with complementing inclined torque transmitting dentil teeth 26 and 27, respectively. The dentil teeth are of the saw-toothed variety to provide a one-way overrunning clutch connection.

A barrel shaped housing 28, having a closed and an open end, is slidably supported at its closed end 29 adjacent the rear or left-hand external surface of the sleeve 13. A lock ring 31 seated in a notch in the open end of the housing has sufficient radial length to engage the pinion offset 23 when the pinion has moved to an extreme right-hand position relative to the housing to thereby confine the clutch elements within the housing cavity. An annular spacer 32 positioned in the housing adjacent the lock ring is juxtaposed over the clutch members' teeth when the clutch members assume the idle, driving or overrunning positions (best illustrated in FIGURE 1). The axial extremities of the spacer engage the lock ring 31 and the flange 19 and thereby effectively limit the extent of dentil engagement when the clutch is in the aforementioned positions. When the driven clutch moves to the left relative to the housing as during clutch indexing operations (best illustrated in FIGURE 2), the spacer then becomes ineffective and the dentils are permitted to mesh to the full extent of the dentil depth.

The sleeve 13 is provided with a radial shoulder 36 intermediate its extremity to provide an abutment for a disc or washer 37 slidably journalled on the sleeve. A resiliently yieldable cylinder 38, preferably of an elastically deformable material such as rubber, is compressively confined between the disc and the closed end 29 of the housing. A clutch spring 39 is compressively confined between the disc and the flange 19 to normally bias the driving clutch member into engagement with the driven clutch member and the spacer element. A pair of cup-like retainer structures 33 and 34 are supported on the sleeve within the convolution of spring 39 and intermediate the helical splines 16 and washer 37. The cups open axially toward each other and a second spring 35 is confined within and between the cups.

Means for moving the sleeve, housing and associated parts toward and away from the engine gear are provided comprising a shift collar 41 which combines with the housing closed end to form a swivel for a fork member 42. The collar is confined on the sleeve by a thrust ring 43. It is understood as is well known in the art that the fork combines with other means (not shown) for controlling the energization of the starting motor.

In operation, when it is desired to start the engine, the fork member 42 will be actuated by means not forming a part of this invention and through the swivel connection with the collar 41 will axially urge the housing 28 and its associated parts toward the gear 18 of the engine to be started. Axial displacement of the housing will be transferred to the sleeve 13 by the compression element 38, disc washer 37 and shoulder 36, and simultaneously the axial motion will be transferred to the driving clutch 17 by the spring member 39. Sleeve 13 will be limited to axial movement by reason of its splined connection to the power shaft 12. The driving clutch 17 is biased into engagement with the driven clutch member 24 of the pinion and the spacer element 32. The camming action between the clutch dentil teeth will tend to prevent full mesh of the dentils and provide a limited lost motion. The spacer thus limits forward movement of the driving clutch relative to the housing and also limits the degree of clutch dentil mesh permitted thereby providing means for obtaining a degree of dentil lost motion.

The sleeve bearing 20 since it is secured to the sleeve 13 will move toward the engine gear regardless of the contamination on the armature shaft. The pinion journalled thereon will also move toward the gear 18 without being retarded. If the pinion were positioned directly on the armature shaft, any contaminants on the shaft would retard or halt pinion axial movement but the remainder of the drive elements would continue to move forward. Pinion retardation would cause the driving clutch member to traverse the helical splines and prematurely index the pinion. If tooth abutment subsequently occurred there would not be adequate indexing travel left and the tooth abutment could not be cleared in the manner hereinafter described. If tooth abutment should occur between the pinion and engine ring gear, the pinion will be moved rearwardly relative to the housing causing the clutch dentils to completely mesh and eliminate the lost motion. Continued rearward movement thereafter causes the driving clutch to also move rearwardly against the bias of the spring 39. Since the driving clutch is supported on helical splines 16, any movement of this clutch member will be accompanied by a rotary as well as axial movement. This rotary movement will in turn be transmitted through the driven clutch member to the pinion to rotate the pinion relative to the engine gear and eliminate tooth abutment. Extreme indexing movements of the clutch member will cause the driving clutch member to engage the cup-shaped retainer member 34 and will compress the spring 35. Rearward clutch member movement during indexing, or during overrun for that matter, is effectively limited when the edge portions of the retainers abut. If the tooth abutment is not cleared when the retainers abut then the entire starting cycle will have to be repeated. The retainers also act to confine the spring 35 and prevent its detrimental engagement with the spring 39. When the gears are in proper alignment, the spring 39 will assert its biasing force on the clutch members and pinion urging them forward to their proper positions relative to the housing. After the drive has engaged the engine gear, the starting motor will be energized and cranking torque will be transmitted from the power shaft 12 and splines 14 to the sleeve 13 and through the splines 16 to the clutch members 17 and 24 and thence to the pinion 21 and the engine ring gear 18. The engine, due to its natural inertia, will initially resist the starting motor torque and deceleration of the starting motor torque will take place. The engine inertia causes the driving clutch member to be threaded on the spline 16 toward the engine gear. Since the driving clutch is in engagement with the spacer member 32, this forward movement will be transferred to the housing by the spacer and lock ring causing the housing to move forward relative to the sleeve. This transferred deceleration torque is absorbed by the compression element 38. After the engine inertia has been overcome, the stored energy is then restored to the drive.

When the engine becomes operative the clutch members will overrun in a normal fashion. The greater the relative difference between the speed at which the pinion is driven by the engine and the speed of the power shaft the greater will be the amount of axial movement of the driving clutch member. The numerous and rapid flexures of the spring 39 resulting from the clutch movements are assisted by the spring 35 which acts as a dampening device for portions of clutch member movements. The dampening effect materially increases the life expectancy of spring 39 and provides a smoother clutch operation.

It will be readily apparent to those skilled in the art that the above described invention attains all the previously stated objects.

I claim:

1. Starter gearing for an internal combustion engine adapted to be supported on the power shaft, comprising:
   a sleeve slidably but non-rotatably connected to the power shaft, said sleeve having external splines formed on one extremity;
   a pinion slidably journalled for axial movement relative to the power shaft adapted for movement into and out of engagement with a gear of an engine to be started;
   a driven clutch member operatively connected to the pinion;
   a driving clutch member threaded on the sleeve splines, said clutch members having complementing inclined torque transmitting teeth adapted to provide an indexing and an overrunning clutch connection;
   a barrel housing, having an open end, slidably supported adjacent the other extremity of the sleeve and spatially encompassing the clutch members;
   means within the housing adjacent the open end thereof adapted for engagement with the clutch members for confining the clutch members within the housing;
   means in the housing for normally biasing the clutch members into engagement;
   resiliently yieldable means interposed between the housing and the sleeve adapted to resist axial movement of the housing relative to the sleeve for absorbing peak starting torque;
   means intermediate the sleeve splines and the resiliently yieldable means adapted for intermittent engagement by the driving clutch member for dampening clutch member movements during portions of clutch overrun and for biasing the clutch members during portions of indexing movements; and,
   means for actuating the housing and sleeve toward and away from the engine gear.

2. Starter gearing for an internal combustion engine adapted to be supported on a power shaft, comprising:
   a sleeve slidably but non-rotatably connected to the power shaft;
   helical spline means on one extremity of the sleeve;
   a pinion slidably journalled for axial movement relative to the power shaft adapted for movement toward and away from a gear of the engine to be started;
   a driven clutch member operatively connected to the pinion;
   a driving clutch member supported on the sleeve adapted to be threaded on the helical splines toward and away from the engine gear, said clutch members including complementing inclined torque transmitting teeth adapted to provide an overrunning and an indexing clutch connection;
   a barrel housing, including an open and a closed end, slidably supported at the closed end adjacent the other extremity of the sleeve, said housing spatially encompassing the clutch member;
   means in the housing adjacent the open end thereof adapted for engagement with the clutch members for confining the clutch members within the housing;
   shoulder means on the sleeve intermediate the extremities thereof;
   a washer member supported within the housing adjacent the sleeve shoulder means;
   resiliently yieldable means interposed between the washer member and the closed end of the housing adapted to resist axial movement of the housing relative to the sleeve;
   a first spring compressively confined between the washer and the driving clutch member for biasing the driving clutch member into operative engagement with the driven clutch member;
   a first cup-shaped member supported on the sleeve adjacent the washer, said cup opening axially toward the driving clutch member;
   a second cup-shaped member supported on the sleeve adjacent the helical splines and opening toward and normally axially spaced from the first cup member;
   a second spring confined within and between said cup members, said second spring and said cup members adapted for engagement by the driving clutch member during portions of clutch overrun to dampen clutch movements and further adapted for engagement by the driving clutch member during portions of clutch indexing movements; and,
   means for actuating the housing and sleeve toward and away from the engine gear.

3. Starting apparatus for an internal combustion engine comprising, in combination:
   a starting motor including a power shaft;
   a sleeve slidably but non-rotatably secured to the power shaft, said sleeve having external splines formed on one extremity thereof;
   a pinion slidably journalled for axial movement relative to the power shaft adapted for movement into and out of engagement with a gear of the engine to be started;
   a driven clutch member secured to the pinion;
   a driving clutch member, including a radial flange member, threaded on the sleeve splines, said clutch members having complementing inclined teeth adapted to provide a power transmitting and an overrunning clutch connection, said driving clutch through its threaded connection with said sleeve splines adapted during engagement of the clutch members to index the pinion relative to the engine gear;
   a barrel housing, having an open end, slidably supported adjacent the other extremity of the sleeve and spatially encompassing the clutch members;
   ring means within the housing adjacent the open end thereof adapted for engagement with the driven clutch member for confining the clutch members within the housing;
   means in the housing for normally biasing the clutch members into engagement;
   means supported between the ring means and the driving clutch flange member for limiting the depth of tooth engagement during the power transmission connection, said last named means being inoperative during clutch indexing movement whereby the teeth are permitted to mesh to the full extent of their depth; and,
   means for actuating the housing and sleeve toward and away from the engine gear and for controlling the energization of the starting motor.

4. Starting apparatus of the type set forth in claim 3 wherein:
   the splines on one extremity of the sleeve supporting the driving clutch member are helical;
   the means for biasing the clutch members into engagement including elastically deformable means adapted to utilize the deceleration torque of the starting motor at the initiation of the power transmission operation; and,
   the means for limiting the depth of clutch tooth mesh comprises an annular spacer element concentrically disposed about the clutch members when the clutch members assume the power transmission and overrunning positions.

5. Starting apparatus for an internal combustion engine comprising, in combination:
   a starting motor having a power shaft;

a sleeve having a straight splined connection to the power shaft, said sleeve adapted to be axially but non-rotatably movable relative to the power shaft;

helical splines formed on one extremity of the sleeve;

a pinion slidably journalled for axial movement relative to the power shaft for movement into and out of engagement with a gear of the engine to be started;

a driven clutch member fixedly secured to the pinion;

a driving clutch member, including a radially outwardly extending flange member, supported on the sleeve and adapted to be threaded on the helical splines for movements toward and away from engine gear, said clutch members including complementing inclined torque transmitting teeth adapted in combination to provide a cranking and an overrunning clutch connection, said driving clutch threaded movements away from the engine gear during engagement of the clutch members being further adapted to index the pinion relative to the engine gear;

a barrel housing, having an open and a closed end, slidably supported at the closed end adjacent the other extremity of the sleeve, said housing spatially encompassing the clutch members, a lock ring in the housing adjacent the open end thereof adapted for engagement with the driven clutch member for confining the clutch member to the housing;

radial shoulder means on the sleeve intermediate the extremities thereof;

a disc washer supported within the housing adapted to abut the shoulder means;

resiliently yieldable means interposed between the disc washer and the closed end of the housing adapted to resist forward axial movement of the housing relative to the sleeve responsive to clutch member movements toward the engine gear whereby the deceleration torque of the starting motor at the initiation of the cranking operation is effectively utilized;

a spring member compressively confined between the disc washer and the driving clutch flange to normally maintain the clutch members in an engaged condition;

an annular spacer element within the housing adjacent the lock ring in juxtaposition with the clutch members' teeth during the cranking and overrunning clutch connection for limiting the depth of clutch teeth engagement, said spacer element adapted to be inoperative during clutch indexing operations whereby the clutch teeth are permitted to mesh to the full extent of their depths; and, means for actuating the housing and sleeve toward and away from the engine gear and for controlling the energization of the starting motor.

References Cited by the Examiner
UNITED STATES PATENTS 1,892,056    12/32    Jackson et al. _____ 74—6
2,841,988    7/58    Sabatini _____ 74—6

BROUGHTON G. DURHAM, *Primary Examiner.*